Sept. 12, 1950 R. R. RANDALL 2,522,193
NONEQUALIZING-TORQUE DIFFERENTIAL GEARING
Filed March 3, 1945 3 Sheets-Sheet 1

Inventor:
Ralph R. Randall

Sept. 12, 1950  R. R. RANDALL  2,522,193
NONEQUALIZING-TORQUE DIFFERENTIAL GEARING
Filed March 3, 1945  3 Sheets-Sheet 2

Inventor:
Ralph R. Randall
By: Thiess, Olson & Mecklenburg
Attys.

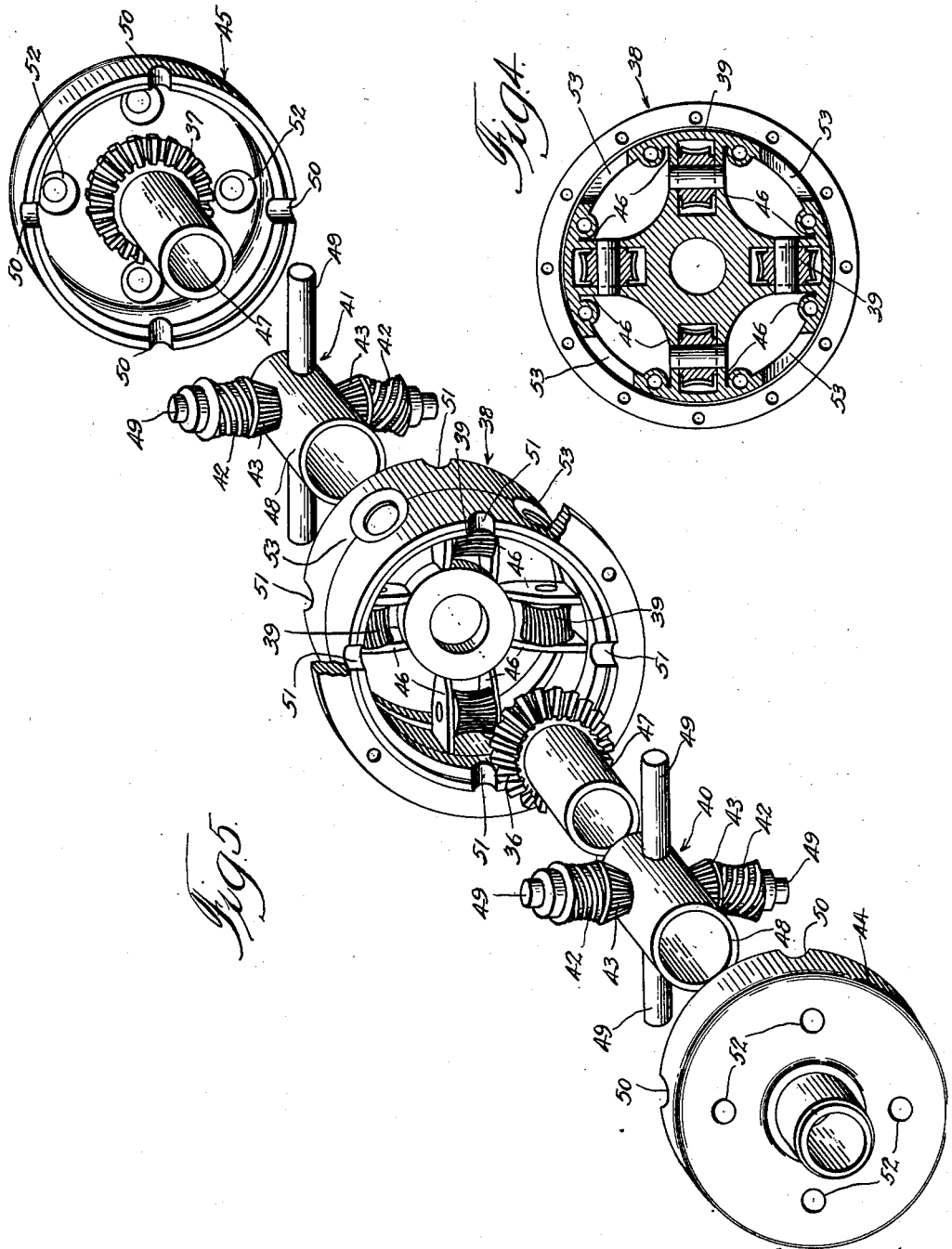

Patented Sept. 12, 1950

2,522,193

UNITED STATES PATENT OFFICE 2,522,193

NONEQUALIZING-TORQUE DIFFERENTIAL GEARING

Ralph R. Randall, Freeport, Ill., assignor, by mesne assignments, to Dualoc Engineering Co., Rockford, Ill., a corporation of Illinois Application March 3, 1945, Serial No. 581,938

21 Claims. (Cl. 74—715)

My invention relates to non-torque-equalizing differential gearing.

This application discloses a construction which is an improvement on or a supplement to the differential shown in my Patent No. 2,342,755.

One of the objects of my invention is to provide such a gearing in which use is made of a pair of gears for the traction drive elements, respectively, in which these gears mesh with a pair of pinions, respectively, which are offset laterally with respect to the gears in the same direction from the faces of the respective gears. This makes possible the use of similar worms, thus adding strength and simplifying the design of the gear teeth and enabling more than two pairs of worms and worm gears to be mounted in each assembly. This is desirable in heavy duty equipment. By the use of more than two sets of worms and worm gears, tooth loading can be held down to a safe point, thus helping to reduce friction which would be caused from excessive tooth loading. This way of meshing the gears also inherently causes the traction wheels to exert opposed forces acting on the worms and pinions when differentiating.

A further object of my invention is to provide improved means for lubricating the differential gearing.

Further objects and advantages of the invention will be apparent from the description and claims.

In the drawings, in which two embodiments of my invention are shown,

Fig. 3 is a vertical axial sectional view showing another form of non-torque-equalizing differential;

Fig. 4 is a section substantially on the line 4—4 of Fig. 3; and

Fig. 5 is an exploded perspective view of the differential transmission.

Figure 1:
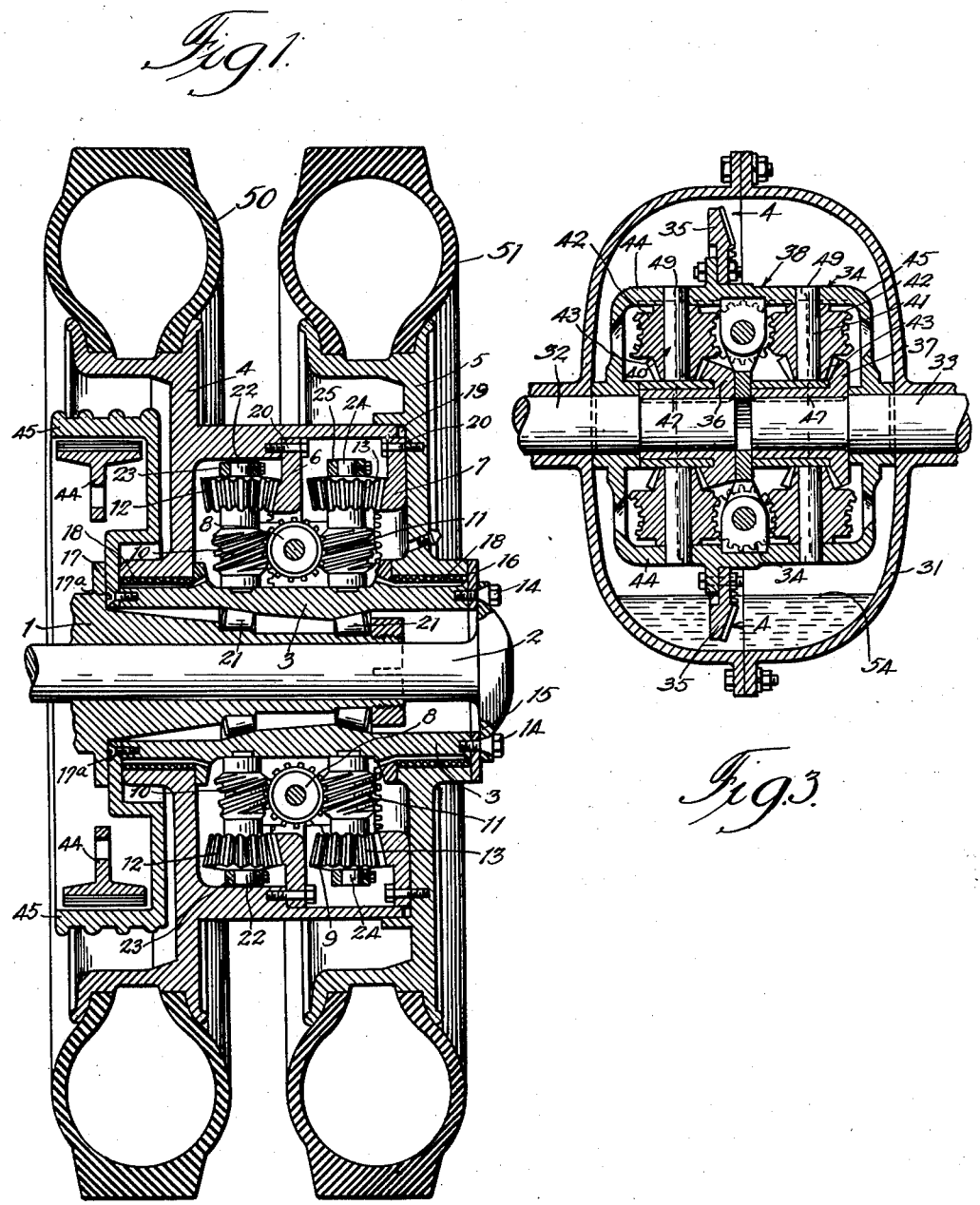
Figure 1 is an axial sectional view of a non-torque-equalizing differential for dual wheel drive.
Figure 2:
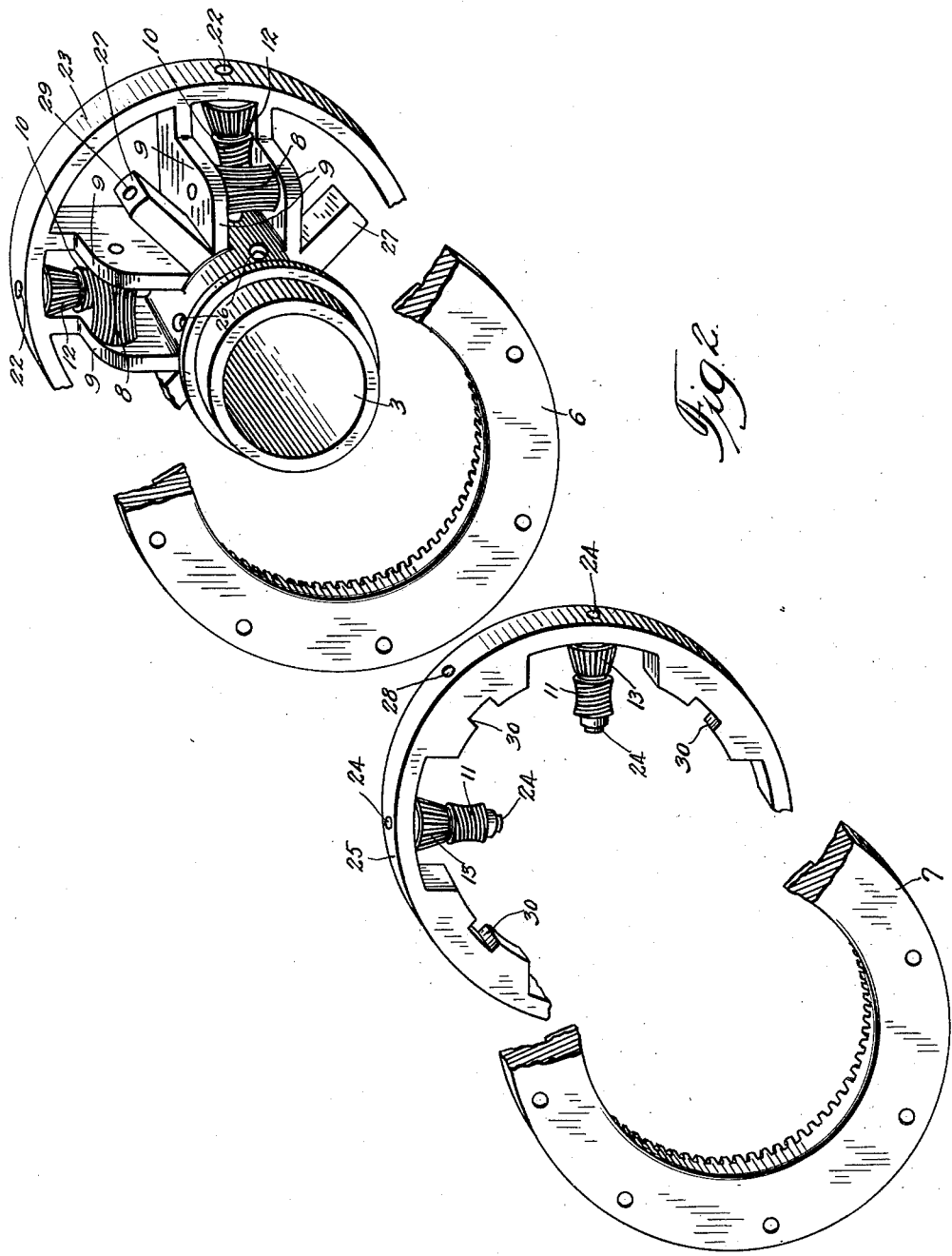
Fig. 2 is an exploded perspective view of the differential.

Referring to the drawings in detail, and first to Figs. 1 and 2, the construction shown therein comprises a non-rotatable bearing sleeve 1 secured to some part of a vehicle, a drive axle or shaft 2 rotatable in the sleeve, a gear assembly support having a hub or sleeve portion 3 rotatably mounted on the bearing sleeve 1 and secured to the drive axle 2 to rotate therewith, a pair of wheels 4 and 5 mounted for rotatable differential movement on the sleeve 3, a pair of annular bevel gears 6 and 7 secured to the wheels 4 and 5, respectively, and a non-torque-equalizing differential gearing transmission between the rotatable sleeve 3 and the wheel secured bevel gears 6 and 7.

The gear assembly and support shown in exploded perspective in Fig. 2 comprises a hub or sleeve 3 secured to rotate with the drive shaft 2, and a bearing bracket construction carried by and rotatable with this hub for supporting the differential gearing. The differential gearing comprises intermeshing worm gear elements, a set of worm gears 8, each mounted between a pair of bearing brackets 9, two sets of worms 10 and 11, one set meshing with one side of the worm gears 8 and the other set meshing with the other side of the worm gears, and two sets of bevel pinions 12 and 13 rotatable with the worms 10 and 11, respectively, and here shown as integral therewith. These two sets of bevel gears mesh, respectively, with the wheel-mounted bevel gears 6 and 7, respectively.

The sleeve 3 is secured to the axle 2 by means of screws 14 extending through a flange 15 on the end of the axle and threaded into the sleeve. A collar 16 is placed between the flange 15 and the sleeve and held in place by these screws, this collar serving to hold the wheel 5 against endwise movement. The brake drum flange 17 is secured to the sleeve 3 by screws 17ª which holds the wheel 4 against endwise movement. Suitable antifriction bearing sleeves 18 may be placed between the hubs of the wheels 4 and 5 and the sleeve 3. An oil seal 19 may be provided between the wheels 4 and 5. The gears 6 and 7 may be secured to the wheels 4 and 5, respectively, by means of cap screws 20. The sleeve 3 may be rotatably mounted on the bearing sleeve 1 by means of antifriction roller bearings 21.

The worms 10 and bevel pinions 12, which are shown as integral, may be mounted on radially extending shafts 22, the outer ends of which are held in a ring 23 which may be formed integral with the bearing brackets 9, the inner ends of these shafts 22 being held in the sleeve 3. The worms 11 and bevel pinions 13 may be mounted on radially extending shafts 24, the outer ends of which are held in a ring 25 and the inner ends of which are seated in suitable openings 26 provided in the sleeve 3. The ring may be secured to four radially extending spokes or arms 27 on the sleeve 3 by means of cap screws, or the like, extending through the opening 28 in the ring and threaded into the opening 29 in the arms 27. This ring 25 is positioned with respect to the sleeve 3 by means of notches 30 into which fit the ends of the radially extending arms 27. It will be noted that the face of the gear 6 lies in the space between planes perpendicular to the axis of the gears 6 and 7 and passing through the axes of the pinions 12 and 13, and that the face of the gear 7 lies outside this space and that the pitch radius of the gears 6 and 7 is greater than the distance between the axis of these gears and the axes of the worm gears 8.

In use, the axle or shaft 2 may be driven in the usual manner from the differential of a vehicle. The sleeve 3 and the gearing 8, 10, 11, 12 and 13, carried thereby, must turn with this axle.

Under good road conditions and with the vehicle travelling straight ahead, there will be no relative motion of the driving worm gears 8 with respect to the driven worms 10 and 11, and there will be no tendency for differentiation between the tractive action of the two wheels 4 and 5, since the forces exerted by the tractive actions of the two wheels on the worm gears 8 act in opposite directions and counteract or counterbalance each other, the tractive effect of one wheel on the worm gears 8 being opposed to the tractive effect of the other wheel on the worm gears.

There are at least two other conditions to be considered, one in which one of the wheels 4 or 5 loses tractive effort due, perhaps, to some road condition, and another when the vehicle is going around a curve. Considering the case in which one of the wheels loses traction, the worm wheels 8 will not be able to transmit torque efficiently to the low traction wheel, due to the pitch of the worm and worm gears. Hence, the low traction wheel will not slip and spin, but the greater part of the torque will be transmitted to the high traction wheel. In the second case, in turning a corner, the torque from the worm gears 8 will be transmitted equally to the two wheels 4 and 5, the differential gearing adjusting itself to the difference in travel of the two traction wheels, due to the counterbalancing effect of the bevel gears 6 and 7 on the worm gears 8.

The construction shown in Figs. 3, 4 and 5 comprises a differential housing 31, two axles 32 and 33 extending in opposite directions from this housing for driving the traction wheels (not shown), a gear carrier and casing 34 in this housing into which the inner ends of the axles extend, a bevel gear 35 secured to this gear carrier and driven from a bevel pinion on the propeller shaft (not shown), bevel gears 36 and 37 keyed on the inner ends of the axles 32 and 33, respectively, and non-torque-equalizing differential gearing carried by said gear carrier for transmitting torque from the bevel gear 35 to said axle-keyed bevel gears 36 and 37.

The gear carrier 34 comprises a central portion 38 in which the worm gears 39 are journalled, two journal spiders 40 and 41 on which the worms 42 and bevel pinions 43 are journalled, and two cover and bearing members 44 and 45 fitting opposite sides of the central portion.

Each worm gear may be journalled between a pair of radially extending bearing brackets 46. Each bevel gear 36 and 37 may be secured or made a part of a sleeve 47, which sleeve may be keyed to one of the axles 32, 33. Each of the journal spiders 40, 41 may comprise a sleeve 48 having four journals 49 extending radially therefrom on each of which journals is mounted an integral combination worm 42 and bevel pinion 43. Each of the cover members 44, 45 is provided with four semicylindrical recesses 50, which match up with corresponding semicylindrical recesses 51 on the central portion 38, to provide cylindrical seats for the ends of the journal members 49.

In order to insure lubrication of the gears inside of the gear casing, these cover members 44 and 45 are provided with inwardly flaring openings 52, and the central portion 38 is provided with outwardly flaring openings 53. The bevel gear 35 dips into the oil 54 in the bottom of the housing 31, creating a spray which fills the inside of the housings. The rotation of the gear casing 34 will cause the oil-laden air inside the casing to flow out through the peripheral openings 53, and air will be drawn in through the side openings 52 of the casing, creating a constant circulation of oil-laden air, thus insuring thorough lubrication.

Fig. 3 shows a construction for heavy duty type differentials. In this form the pitch diameter of the worm 42 is greater than the pitch diameter of the bevel pinion 43. This results in a relatively low torque on the worm gear and a relatively small diameter of the gear carrier 34. This cuts down the tooth loading on the worm gearing and reduces friction.

In the construction of Fig. 1, in applying the brakes, it is necessary, in order to secure the desired counterbalanced braking effect, that the braking action should be effective on both wheels 4 and 5. This is accomplished by means of an internal expanding brake 44 which acts on a brake drum 45. The drum 45 may be integral with the brake drum flange 17. The braking action takes effect on the wheel 4 and its tire 50 and also takes effect on the wheel 5 having the tire 51. This braking action takes effect on the two gears 6 and 7 and the two wheels 4 and 5 through the brake drum 45, the brake drum flange 17 and sleeve 3 on which the rings 23 and 25 and the gearing 8, 10, 11, 12 and 13 are mounted. Thus the brakes act on the wheels through the same differential mechanism as does the drive axle 2.

Further modifications will be apparent to those skilled in the art and it is desired, therefore, that the invention be limited only by the scope of the appended claims.

Having thus described my invention, what I claim and desire to secure by Letters Patent is:

1. A non-equalizing-torque differential comprising a pair of rotatable substantially coaxially mounted vehicle wheel elements, a pair of gears, one secured to each element and coaxial therewith, a pair of pinions, one meshing with each gear, the axes of said pinions being transverse to the axis of said elements, a pair of worm gearing elements, one rotatable with each pinion, a worm gearing element lying between and meshing with both worm gearing elements of said pair, and a gear carrier rotatable about the axis of said wheel elements on which said pinions and worm gearing elements are mounted, the face of one of said gears lying in the space between those planes perpendicular to the axis of said gears which pass through the axes of said pinions, the face of the other of said gears lying outside said space.

2. A non-equalizing-torque differential comprising a pair of rotatable substantially coaxially mounted vehicle wheel elements, a pair of bevel gears, one secured to each element and coaxial therewith, a pair of bevel pinions, one meshing with each bevel gear, the axes of said bevel pinions being transverse to the axis of said elements, a pair of worms, one rotatable with each bevel pinion, a worm gear lying between and meshing with both worms, and a gear carrier rotatable about the axis of said elements on which said bevel pinions, worms, and worm gear are mounted, the face of one of said gears lying in the space between those planes perpendicular to the axis of said gears which pass through the axes of said pinions, the face of the other of said gears lying outside said space.

3. A non-equalizing-torque differential comprising a pair of rotatable substantially coaxially mounted vehicle wheel elements, a pair of gears, one secured to each element and coaxial therewith, a pair of pinions, one meshing with each gear, the axes of said pinions being transverse to the axis of said elements, a pair of worm gearing elements, one rotatable with each pinion, a worm gearing element lying between and meshing with both worm gearing elements of said pair, and a gear carrier rotatable about the axis of said wheel elements on which said pinions and worm gearing elements are mounted, the face of a first one of said gears being offset laterally with respect to the axis of the pinion with which it meshes and the face of the other gear being offset laterally with respect to the axis of the pinion with which it meshes in the same direction in which the face of said first gear is offset.

4. A non-equalizing-torque differential comprising a pair of rotatable substantially coaxially mounted vehicle wheel elements, a pair of bevel gears, one secured to each element and coaxial therewith, a pair of bevel pinions, one meshing with each bevel gear, the axes of said bevel pinions being transverse to the axis of said elements, a pair of worms, one rotatable with each bevel pinion, a worm gear lying between and meshing with both worms, and a gear carrier rotatable about the axis of said elements on which said bevel pinions, worms, and worm gear are mounted, the face of a first one of said gears being offset laterally with respect to the axis of the pinion with which it meshes and the face of the other gear being offset laterally with respect to the axis of the pinion with which it meshes in the same direction in which the face of said first gear is offset.

5. A non-equalizing-torque differential comprising a pair of rotatable substantially coaxially mounted vehicle wheel elements, a pair of bevel gears, one secured to each element and coaxial therewith, two sets of bevel pinions, one set meshing with each bevel gear, the axes of said bevel pinions being transverse to the axis of said elements, two sets of worms, one worm rotatable with each bevel pinion, a set of worm gears, each worm gear lying between and meshing with a worm of both sets, and a gear carrier rotatable about the axis of said elements on which said bevel pinions, worms, and worm gears are mounted, the face of a first one of said gears being offset laterally with respect to the axis of the pinion with which it meshes and the face of the other gear being offset laterally with respect to the axis of the pinion with which it meshes in the same direction in which the face of said first gear is offset.

6. A non-equalizing-torque differential comprising a pair of rotatable substantially coaxially mounted vehicle wheel elements, a pair of gears, one secured to each element and coaxial therewith, a pair of pinions, one meshing with each gear, the axes of said pinions being transverse to the axis of said elements, a pair of worm gearing elements, one rotatable with each pinion, a worm gearing element lying between and meshing with both worm gearing elements of said pair, and a gear carrier rotatable about the axis of said wheel elements on which said pinions and worm gearing elements are mounted, the face of a first one of said gears being offset laterally with respect to the axis of the pinion with which it meshes and the face of the other gear being offset laterally with respect to the axis of the pinion with which it meshes in the same direction in which the face of said first gear is offset, the pitch radius of said gears being greater than the shortest distance between the axis of said gears and the axis of said last worm gear elements.

7. A non-equalizing-torque differential comprising a pair of rotatable substantially coaxially mounted vehicle wheel elements, a pair of bevel gears, one secured to each element and coaxial therewith, a pair of bevel pinions, one meshing with each bevel gear, the axes of said bevel pinions being transverse to the axis of said elements, a pair of worms, one rotatable with each bevel pinion, a worm gear lying between and meshing with both worms, and a gear carrier rotatable about the axis of said elements on which said bevel pinions, worms, and worm gear are mounted, the face of a first one of said gears being offset laterally with respect to the axis of the pinion with which it meshes and the face of the other gear being offset laterally with respect to the axis of the pinion with which it meshes in the same direction in which the face of said first gear is offset, the pitch radius of said gears being greater than the shortest distance between the axis of said gears and the axis of said worm gears.

8. A non-equalizing-torque differential comprising a pair of rotatable substantially coaxially mounted vehicle wheel elements, a pair of gears, one secured to each element and coaxial therewith, a pair of pinions, one meshing with each gear, the axes of said pinions being transverse to the axis of said elements, a pair of worm gearing elements, one rotatable with each pinion, a worm gearing element lying between and meshing with both worm gearing elements of said pair, and a gear carrier rotatable about the axis of said wheel elements on which said pinions and worm gearing elements are mounted, the face of a first one of said gears being offset laterally with respect to the axis of the pinion with which it meshes and the face of the other gear being offset laterally with respect to the axis of the pinion with which it meshes in the same direction in which the face of said first gear is offset, said pinions being closer to the axis of said gears than are the worm gear elements which are rotatable therewith.

9. A non-equalizing torque differential comprising a pair of rotatable substantially coaxially mounted vehicle wheel elements, a pair of bevel gears, one secured to each element and coaxial therewith, a pair of bevel pinions, one meshing with each bevel gear, the axes of said bevel pinions being transverse to the axis of said elements, a pair of worms, one rotatable with each bevel pinion, a worm gear lying between and meshing with both worms, and a gear carrier rotatable about the axis of said elements on which said bevel pinions, worms, and worm gear are mounted, the face of a first one of said gears being offset laterally with respect to the axis of the pinion with which it meshes and the face of the other gear being offset laterally with respect to the axis of the pinion with which it meshes in the same direction in which the face of said first gear is offset, the pitch radius of said gears being less than the shortest distance between the axis of said gears and the axes of said worm gears.

10. A non-equalizing-torque differential comprising a pair of rotatable substantially coaxially mounted vehicle wheel elements, a pair of bevel gears, one secured to each element and coaxial therewith, two sets of bevel pinions, one set meshing with each bevel gear, the axes of said bevel pinions being transverse to the axis of said elements, two sets of worms, one worm rotatable with each bevel pinion, a set of gears, each worm gear lying between and meshing with a worm of both sets, and a gear carrier rotatable about the axis of said elements on which said bevel pinions, worms, and worm gears are mounted, the face of a first one of said gears being offset laterally with respect to the axis of the pinion with which it meshes and the face of the other gear being offset laterally with respect to the axis of the pinion with which it meshes in the same direction in which the face of said first gear is offset, the pitch radius of said gears being less than the shortest distance between the axis of said gears and the axes of said worm gears.

11. A non-equalizing-torque differential comprising a pair of rotatable substantially coaxially mounted vehicle wheel elements, a pair of gears, one secured to each element and coaxial therewith, a pair of pinions, one meshing with each gear, the axes of said pinions being transverse to the axis of said elements, a pair of worm gearing elements, one rotatable with each pinion, a worm gearing element lying between and meshing with both worm gearing elements of said pair, and a gear carrier rotatable about the axis of said wheel elements on which said pinions and worm gearing elements are mounted, said pinions being closer to the axis of said gears than are the worm gear elements which are rotatable therewith.

12. A non-equalizing-torque differential comprising a pair of rotatable substantially coaxially mounted vehicle wheel elements, a pair of bevel gears, one secured to each element and coaxial therewith, a pair of bevel pinions, one meshing with each bevel gear, the axes of said bevel pinions being transverse to the axis of said elements, a pair of worms, one rotatable with each bevel pinion, a worm gear lying between and meshing with both worms, and a gear carrier rotatable about the axis of said elements on which said bevel pinions, worms, and worm gear are mounted, the pitch radius of said gears being less than the shortest distance between the axis of said gears and the axes of said worm gears.

13. A non-equalizing-torque differential comprising a pair of rotatable substantially coaxially mounted vehicle wheel elements, a pair of bevel gears, one secured to each element and coaxial therewith, a pair of bevel pinions, one meshing with each bevel gear, the axes of said bevel pinions being transverse to the axis of said elements, a pair of worms, one rotatable with each bevel pinion, a worm gear lying between and meshing with both worms, and a gear carrier rotatable about the axis of said elements on which said bevel pinions, worms, and worm gear are mounted, the face of a first one of said gears being offset laterally with respect to the axis of the pinion with which it meshes and the face of the other gear being offset laterally with respect to the axis of the pinion with which it meshes in the same direction in which the face of said first gear is offset, the pitch radius of said gears being less than the shortest distance between the axis of said gears and the axes of said worm gears, the pitch diameter of said worms being greater than the pitch diameter of the bevel pinions.

14. A non-equalizing-torque differential comprising a pair of rotatable substantially coaxially mounted vehicle wheel elements, a pair of bevel gears, one secured to each element and coaxial therewith, two sets of bevel pinions, each set comprising one or more bevel pinions, one set meshing with each bevel gear, the axes of said bevel pinions being transverse to the axis of said elements, two sets of worms, each set comprising one or more worms, one worm rotatable with each bevel pinion, a set of worm gears, each worm gear lying between and meshing with a worm of both sets, and a gear carrier rotatable about the axis of said elements on which said bevel pinions, worms, and worm gears are mounted, the face of a first one of said gears being offset laterally with respect to the axis of the pinion with which it meshes and the face of the other gear being offset laterally with respect to the axis of the pinion with which it meshes in the same direction in which the face of said first gear is offset.

15. A non-equalizing-torque differential comprising a pair of rotatable substantially coaxially mounted vehicle wheel elements, a pair of bevel gears, one secured to each element and coaxial therewith, two sets of bevel pinions, each set comprising one or more bevel pinions, one set meshing with each bevel gear, the axes of said bevel pinions being transverse to the axis of said elements, two sets of worms, each set comprising one or more worms, one worm being rotatable with each bevel pinion, a set of worm gears, each lying between and meshing with a worm of each set, and a gear carrier rotatable about the axis of said elements on which said bevel pinions, worms, and worm gears are mounted, the face of a first one of said bevel gears being offset laterally with respect to the axis of the pinions with which it meshes and the face of the other bevel gear being offset laterally with respect to the axis of the pinions with which it meshes in the same direction in which the face of said first gear is offset, the pitch radius of said bevel gears being greater than the shortest distance between the axis of said bevel gears and the axis of said worm gear.

16. A non-equalizing-torque differential comprising a pair of rotatable substantially coaxially mounted vehicle wheel elements, a pair of bevel gears, one secured to each element and coaxial therewith, a pair of bevel pinions, one meshing with each bevel gear, the axes of said bevel pinions being transverse to the axis of said elements, a pair of worms, one rotatable with each bevel pinion, a worm gear lying between and meshing with both worms, and a gear carrier rotatable about the axis of said elements on which said bevel pinions, worms, and worm gear are mounted, the face of a first one of said gears being offset laterally with respect to the axis of the pinion with which it meshes and the face of the other gear being offset laterally with respect to the axis of the pinion with which it meshes in the same direction in which the face of said first gear is offset, the pitch diameter of said worms being greater than the pitch diameter of the bevel pinions.

17. In a dual wheel assembly, a non-equalizing-torque differential comprising a pair of rotatable substantially coaxially mounted vehicle wheel elements mounted side by side, a pair of gears, one secured to each element and coaxial therewith, a pair of pinions, one meshing with each gear, the axes of said pinions being transverse to the axis of said elements, a pair of worm gearing elements, one rotatable with each pinion, a worm gearing element lying between and meshing with both worm gearing elements of said pair, a gear carrier rotatable about the axis of said wheel elements on which said pinions and worm gearing elements are mounted, and brake means acting through said gear carrier for braking both of said drive elements.

18. In a dual wheel assembly, a non-equalizing-torque differential comprising a pair of rotatable substantially coaxially mounted vehicle wheel elements mounted side by side, a pair of gears, one secured to each element and coaxial therewith, a pair of pinions, one meshing with each gear, the axes of said pinions being transverse to the axis of said elements, a pair of worm gearing elements, one rotatable with each pinion, a worm gearing element lying between and meshing with both worm gearing elements of said pair, a gear carrier rotatable about the axis of said wheel elements on which said pinions and worm gearing elements are mounted, the face of one of said gears lying in the space between those planes perpendicular to the axis of said gears which pass through the axes of said pinions, the face of the other of said gears lying outside said space, and brake means acting through said gear carrier for braking both of said drive elements.

19. In a dual wheel assembly, a non-equalizing-torque differential comprising a pair of rotatable substantially coaxially mounted vehicle wheel elements mounted side by side, a pair of bevel gears, one secured to each element and coaxial therewith, a pair of bevel pinions, one meshing with each bevel gear, the axes of said bevel pinions being transverse to the axis of said elements, a pair of worms, one rotatable with each bevel pinion, a worm gear lying between and meshing with both worms, a gear carrier rotatable about the axis of said elements on which said bevel pinions, worms, and worm gear are mounted, the face of a first one of said gears being offset laterally with respect to the axis of the pinion with which it meshes and the face of the other gear being offset laterally with respect to the axis of the pinion with which it meshes in the same direction in which the face of said first gear is offset, the pitch radius of said gears being greater than the shortest distance between the axis of said gears and the axis of said worm gears, and brake means acting through said gear carrier for braking both of said drive elements.

20. In a dual wheel assembly, a non-equalizing torque differential comprising a pair of rotatable substantially coaxially mounted vehicle wheel elements mounted side by side, a pair of bevel gears, one secured to each element and coaxial therewith, a pair of bevel pinions, one meshing with each bevel gear, the axes of said bevel pinions being transverse to the axis of said elements, a gear carrier rotatable about the axis of said elements on which said bevel pinions are mounted, and a non-equalizing torque differential mechanism between said gear carrier and said bevel pinions, the face of a first one of said gears being offset laterally with respect to the axis of the pinion with which it meshes and the face of the other gear being offset laterally with respect to the axis of the pinion with which it meshes in the same direction in which the face of said first gear is offset.

21. In a dual wheel assembly, a non-torque-equalizing differential comprising a pair of rotatable substantially coaxially mounted vehicle wheel elements mounted side by side, a pair of gears, one secured to each element and coaxial therewith, a gear carrier rotatable about the axis of said elements, and planet gearing mounted on said gear carrier comprising a planet gear mounted on said gear carrier and a substantially irreversible self-locking planetary gearing between said planet gear and each of said pair of gears whereby said planet gear is prevented from transmitting any substantial torque from one of said pair of gears to the other, enabling either wheel element to advance with respect to the other when urged by frictional engagement with the roadway and preventing either of said wheel elements from advancing or reversing with respect to the other when not in effective frictional engagement with the roadway.

RALPH R. RANDALL.

REFERENCES CITED

The following references are of record in the file of this patent:

UNITED STATES PATENTS

| Number | Name | Date |
| --- | --- | --- |
| 1,112,422 | Graham | Sept. 29, 1914 |
| 1,404,791 | Nogrady | Jan. 31, 1922 |
| 1,775,312 | Heap | Sept. 9, 1930 |
| 2,342,755 | Randall | Feb. 29, 1944 |
| 2,355,133 | Ash | Aug. 8, 1944 |